(12) United States Patent
Han et al.

(10) Patent No.: US 12,348,573 B2
(45) Date of Patent: Jul. 1, 2025

(54) WIRELESS COMMUNICATION APPARATUS SUPPORTING RICH COMMUNICATION SUITE (RCS) AND WIRELESS COMMUNICATION METHOD THEREOF

(71) Applicant: Samsung Electronics Co., Ltd., Suwon-si (KR)

(72) Inventors: Dongku Han, Suwon-si (KR); Kedar Santosh Kumar Aalla, Bangalore (IN); Jaya Prakash Sivapuram, Bangalore (IN); Shrihari Shridhar Hegde, Bangalore (IN); Srinivas Chinthalapudi, Bangalore (IN); Jiyoung Yu, Gwacheon-si (KR); Bora Hyun, Hwaseong-si (KR); Thejeswara Reddy Pocha, Bangalore (IN); Taeyun An, Hwaseong-si (KR); Junghoon Lee, Seongnam-si (KR); Jaesang Lim, Suwon-si (KR); Jinsu Jeong, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 121 days.

(21) Appl. No.: 17/720,600

(22) Filed: Apr. 14, 2022

(65) Prior Publication Data
US 2022/0337636 A1    Oct. 20, 2022

(30) Foreign Application Priority Data

Apr. 16, 2021   (IN) .............................. 202121017784
Feb. 18, 2022   (KR) ........................ 10-2022-0021729

(51) Int. Cl.
*H04M 1/253*     (2006.01)
*H04L 65/1069*   (2022.01)
(Continued)

(52) U.S. Cl.
CPC ..... *H04L 65/1069* (2013.01); *H04W 72/0453* (2013.01); *H04W 80/06* (2013.01); *H04W 80/10* (2013.01)

(58) Field of Classification Search
CPC ....... H04W 72/04; H04W 8/04; H04W 12/04; H04W 8/18; H04L 65/1069;
(Continued)

(56) References Cited

U.S. PATENT DOCUMENTS 7,480,254 B2   1/2009   Mayer
8,285,852 B2   10/2012  Åstrom et al.
(Continued)

FOREIGN PATENT DOCUMENTS

KR    101502493 B1    3/2015

OTHER PUBLICATIONS

"iOS 13.1.1 Can Perform Vowifi Calling Through Mobile Data of Another SIM".
(Continued)

*Primary Examiner* — Marcus Smith
*Assistant Examiner* — Jason A Harley
(74) *Attorney, Agent, or Firm* — Harness, Dickey & Pierce, P.L.C.

(57) ABSTRACT

A wireless communication method supporting a Rich Communication Suite (RCS) service, the method including performing an RCS provision operation corresponding to an Original Equipment Manufacturer (OEM) application in response to an RCS service request of the OEM application, transmitting an RCS function connection request to a Session Initiation Protocol (SIP) transport layer after the RCS provision operation is completed, controlling a session for an RCS function based on the RCS function connection request to obtain a dedicated bearer, and exchanging RCS media data with a network through the dedicated bearer.

20 Claims, 9 Drawing Sheets

(51) Int. Cl.
*H04L 65/1104* (2022.01)
*H04W 4/14* (2009.01)
*H04W 8/06* (2009.01)
*H04W 8/18* (2009.01)
*H04W 60/00* (2009.01)
*H04W 72/04* (2023.01)
*H04W 72/0453* (2023.01)
*H04W 80/06* (2009.01)
*H04W 80/10* (2009.01)

(58) Field of Classification Search
CPC ............. H04L 65/1016; H04L 65/1104; H04L 65/1101; H04M 15/63
USPC ........................ 370/329; 379/201.01, 201.02
See application file for complete search history.

(56) References Cited

U.S. PATENT DOCUMENTS

| | | | |
|---|---|---|---|
| 9,107,049 B2 | 8/2015 | Lindsay et al. | |
| 9,152,478 B2 | 10/2015 | Narayanan et al. | |
| 9,161,302 B2 | 10/2015 | Belghoul | |
| 9,509,724 B2 | 11/2016 | Runeson et al. | |
| 9,756,088 B2 | 9/2017 | Balasubramanian et al. | |
| 9,930,074 B2 | 3/2018 | Chebolu et al. | |
| 10,091,251 B2 | 10/2018 | Fleury et al. | |
| 2010/0074109 A1* | 3/2010 | Klingenbrunn | H04W 36/16 370/230 |
| 2013/0332503 A1* | 12/2013 | Bae | H04W 80/08 709/201 |
| 2014/0010148 A1 | 1/2014 | Ali et al. | |
| 2015/0127842 A1* | 5/2015 | Lindsay | H04L 65/1073 709/228 |
| 2015/0271445 A1 | 9/2015 | Lindsay et al. | |
| 2016/0226925 A1* | 8/2016 | Chebolu | H04L 65/1069 |
| 2017/0005989 A1* | 1/2017 | Jia | H04L 67/56 |
| 2019/0045335 A1 | 2/2019 | Jin et al. | |

OTHER PUBLICATIONS

"Noth America RCS Common Implementation Guidelines Version 1.0" GSM Association, May 5, 2015.
"RCS Device API 1.6 Specification Version 4.0" GSM Association, Mar. 1, 2016.
"Universal Mobile Telecommunications System (UMTS); Generic Authentication Architecture (GAA); Genereic Bootstrapping Architecture (3GPP TS 33.220 Version 6.3.0 Release 6)" ETSI TS 133 220 (Dec. 2004).
"OMA GBA Profile" Open Mobile Alliance Ltd. Jul. 31, 2012, pp. 1-20.
"Digital Cellular Telecommunications System (Phase 2+); Universal Mobile Telecommunications System (UMTS); LTE; Policy and Charging Control Architecture (3GPP TS 23.203 Version 12.6.0 Release 12)" ETSI TS 123 203 V12.6.0 (Sep. 2014).
Rosenberg et al. "SIP: Session Initiation Protocol" The Internet Society (Jun. 2002).
"Rich Communication Suite 5.1 Advanced Communications Services and Client Specification Version 2.0" GSM Association, May 3, 2013.
"Rich Communication Suite RCS API Detailed Requirements Version 5.0" GSM Association, Oct. 16, 2019.
"RCS Interworking Guidelines Version 14.0" GSM Association, Oct. 13, 2017.
"iOS 13.1.1 Can Perform Vowifi Calling Through Mobile Data of Another SIM" Apple, Jan. 10, 2019.
"Using Dual SIM with an eSIM" Apple, Jul. 14, 2021.

\* cited by examiner

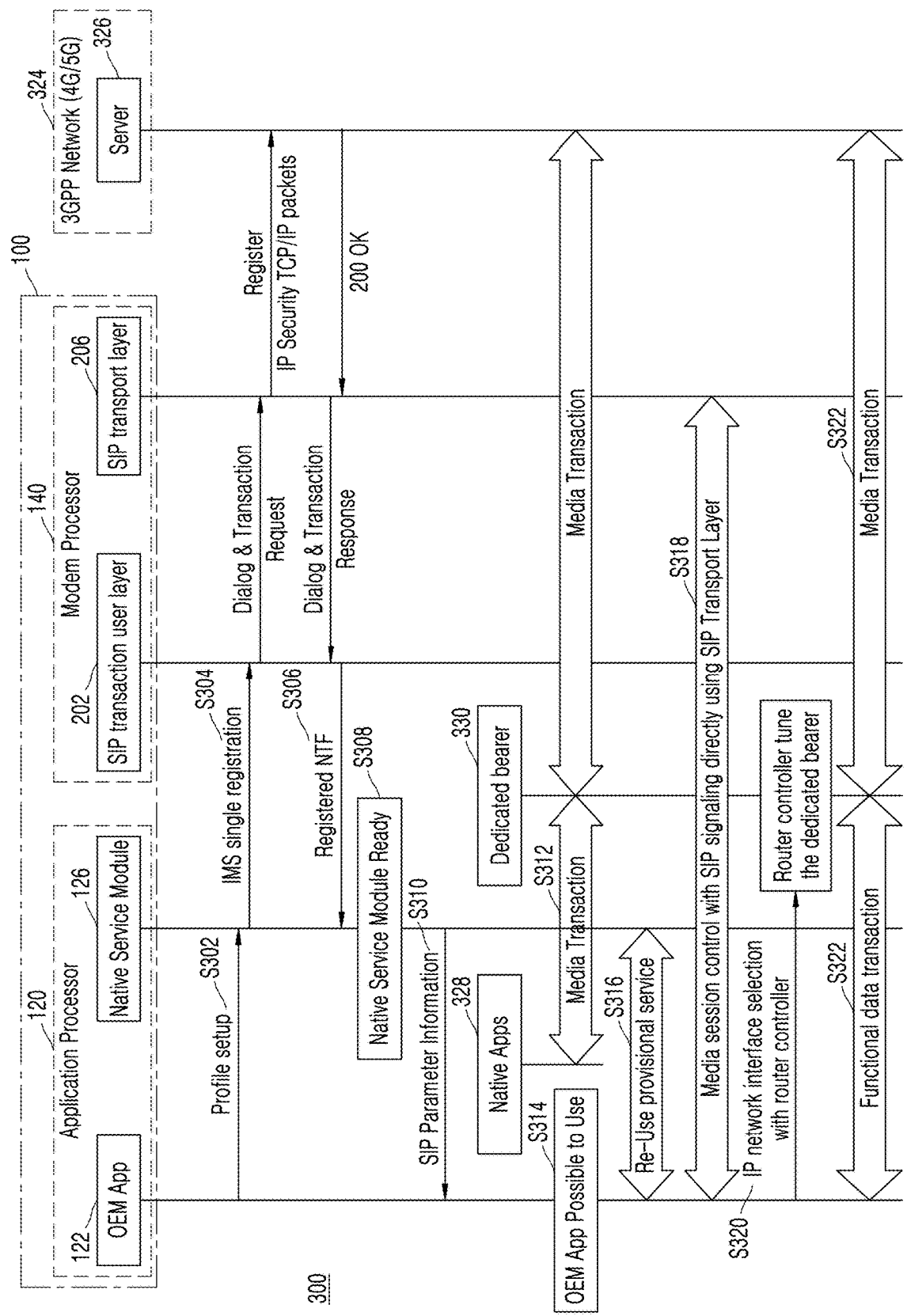

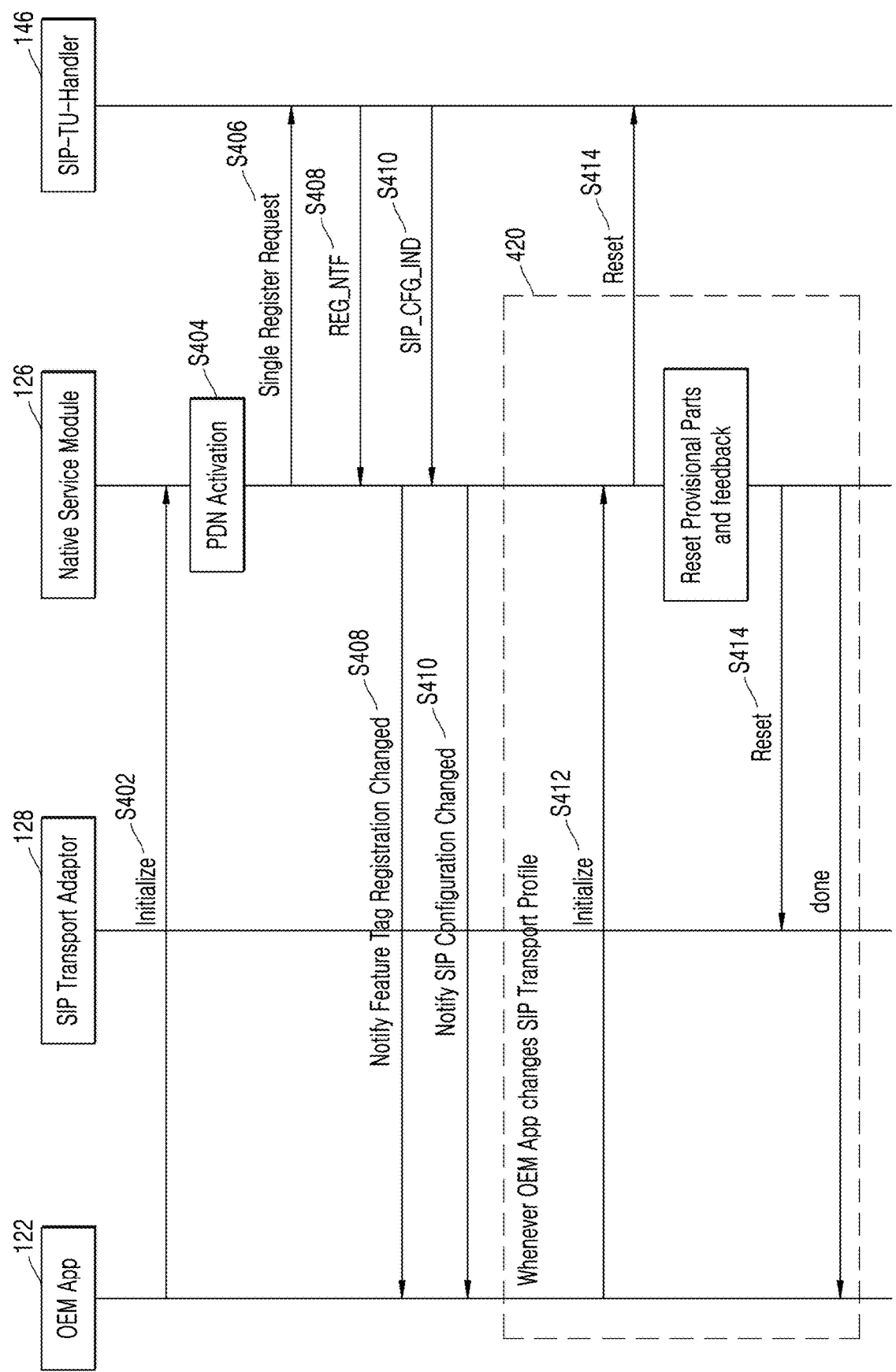

WIRELESS COMMUNICATION APPARATUS SUPPORTING RICH COMMUNICATION SUITE (RCS) AND WIRELESS COMMUNICATION METHOD THEREOF

CROSS-REFERENCE TO RELATED APPLICATION

This application is based on and claims priority under 35 U.S.C. § 119 to Indian Patent Application No. 202121017784, filed on Apr. 16, 2021 in the Indian Intellectual Property Office, and Korean Patent Application No. 10-2022-0021729, filed on Feb. 18, 2022 in the Korean Patent Office, the disclosure both of which is incorporated by reference herein in its entirety.

BACKGROUND

The inventive concepts relate to a method and apparatus supporting a Rich Communication Suite (RCS) service, and more particularly, to a wireless communication apparatus and method including a Session Initiation Protocol (SIP) transport layer and a SIP transport adapter, which are connected through a SIP transport interface, and accordingly, allow an Original Equipment Manufacturer (OEM) application to directly use the SIP transport layer and a media-dedicated bearer.

To meet the increasing demand for wireless data traffic after the commercialization of the 4th Generation (4G) communication system, the development of an improved 5th Generation (5G) communication system is in progress. Recently, the introduction of mobile terminals that may use data services by accessing a communication network is accelerating with the growth of Long Term Evolution (LTE) networks and the introduction of 5G New Radio (NR) networks, and Voice over Long Term Evolution (VoLTE) supporting voice calls using 4G LTE network and Voice over New Radio (VoNR) supporting voice calls using 5G NR network are introduced, and thus mobile communication is developing.

In addition, with the development of mobile communication, users of mobile terminals simply use mobile terminals for various purposes other than voice calls. Accordingly, the Global System for Mobile Communications Association (GSMA) proposed a Rich Communication Suite (RCS) that provides various communication functions to users of mobile terminals through a communication network. RCS service is an IP Multimedia Subsystem (IMS)-based unified messaging service, which enables not only voice but also videos, short message services (SMS), chats, file sharing, or the like to be integrated for use through a communication network. As a particular example, the RCS service may provide a call function (Enriched Call) in which multimedia files such as videos or photos are shared during a call, an address book function (Enhanced Phonebook) in which information about a communication partner registered in the address book may be obtained in real time, and a message function (Enriched Messaging) in which files may be shared during chat.

IMS, which forms the basis of RCS service, is a standard of network frameworks adopted by 3rd Generation Partnership Project (3GPP) to provide multimedia services in Internet Protocol (IP) networks. The IMS standard defines signal connection processing between target terminals that want to use the service, media processing that transmits actual service data, and the quality and billing method according thereto. A typical protocol used in IMS is Session Initiation Protocol (SIP), which is a multimedia communication protocol for setting, changing, and terminating sessions.

As the performance of terminals and wireless networks is improved, research on a wireless communication apparatus and a wireless communication method capable of providing an RCS service along with VoLTE/VoNR services has been recently expanded.

SUMMARY

The inventive concepts provide a wireless communication apparatus and a wireless communication method, wherein the wireless communication apparatus enables IP multimedia subsystem (IMS) single registration and use of a dedicated bearer by including a session initiation protocol (SIP) transport interface configured to allow direct access to a SIP transport layer of a modem processor from an application processor performing a Rich Communication Suite (RCS) service of an original equipment manufacturer (OEM) application, the SIP transport layer, and a SIP transport adapter.

According to an aspect of the inventive concepts, there is provided a wireless communication method supporting a Rich Communication Suite (RCS) service, including performing an RCS provision operation corresponding to an Original Equipment Manufacturer (OEM) application in response to an RCS service request of the OEM application, transmitting an RCS function connection request to a Session Initiation Protocol (SIP) transport layer after the RCS provision operation is completed, controlling a session for an RCS function based on the RCS function connection request to obtain a dedicated bearer, and exchanging RCS media data with a network through the dedicated bearer.

According to an aspect of the inventive concepts, there is provided a wireless communication apparatus supporting a Rich Communication Suite (RCS) service, including processing circuitry configured to perform an RCS provision operation corresponding to an Original Equipment Manufacture (OEM) application, the OEM application corresponding to an RCS function, and a SIP transport layer configured to be connected to the OEM application through a SIP transport interface.

According to an aspect of the inventive concepts, there is provided a modem processor supporting a Rich Communication Suite (RCS), including processing circuitry configured to perform an RCS provision operation corresponding to an Original Equipment Manufacturer (OEM) application in response to an RCS service request of the OEM application, and transmit an RCS function connection request from the OEM application to a Session Initiation Protocol (SIP) transport layer after the RCS provision operation is completed, the SIP transport layer configured to control a session for an RCS function based on the RCS function.

BRIEF DESCRIPTION OF THE DRAWINGS

Embodiments of the inventive concepts will be more clearly understood from the following detailed description taken in conjunction with the accompanying drawings in which:

FIG. 3 is a flowchart schematically illustrating an a method of operating a SIP transport layer using a SIP stack according to embodiments of the inventive concepts;

FIG. 4 is a flowchart illustrating a synchronization method of initializing a SIP transport layer and for IP Multimedia Subsystem (IMS) single registration, according to embodiments of the inventive concepts;

DETAILED DESCRIPTION

Hereinafter, embodiments of the inventive concepts will be described in detail with reference to the accompanying drawings.

Figure 1:
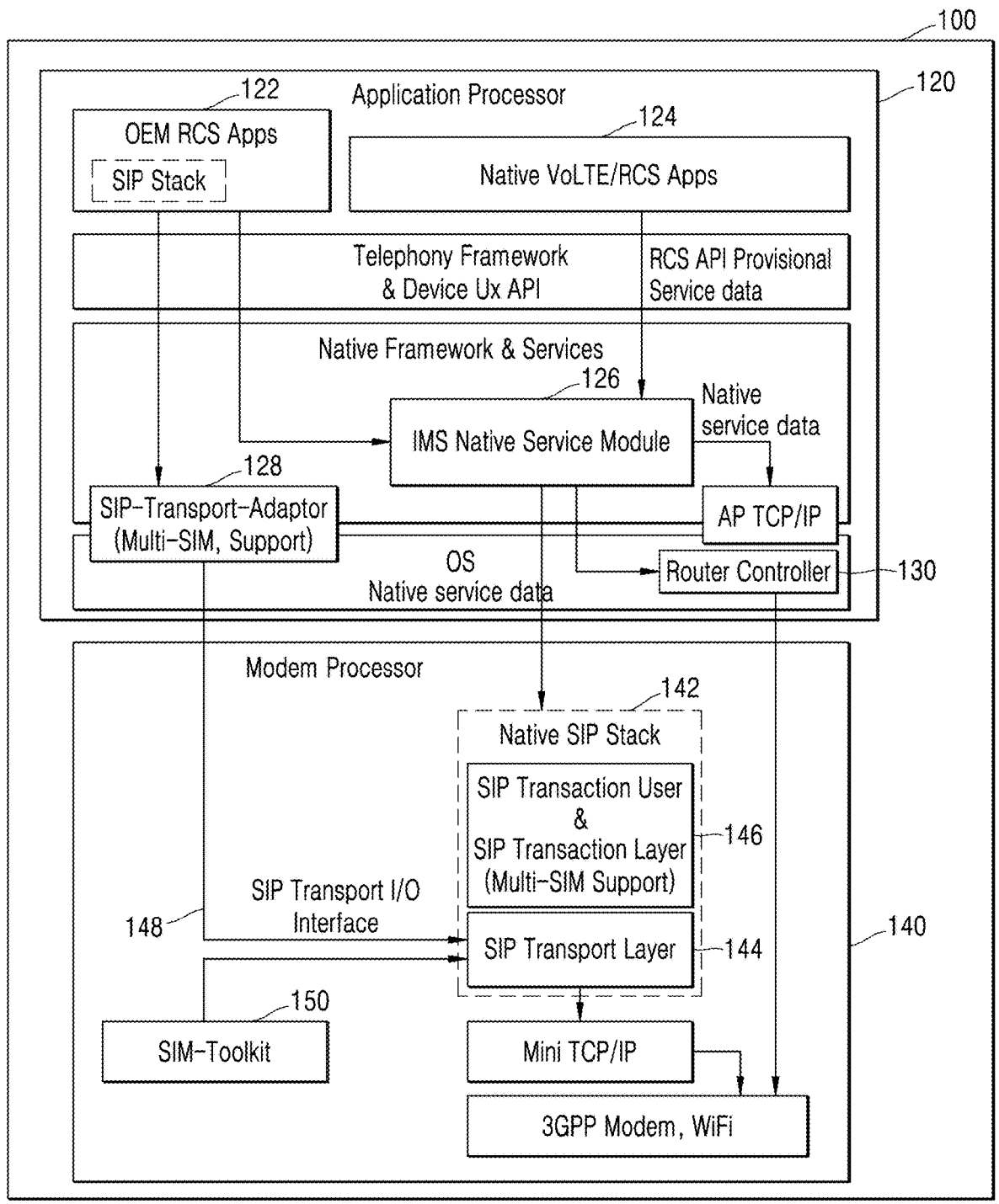
FIG. 1 is a functional block diagram of a wireless communication apparatus supporting a Rich Communication Suite (RCS) service, according to embodiments of the inventive concepts.

FIG. 1 is a functional block diagram of a wireless communication apparatus 100 supporting a Rich Communication Suite (RCS) service, according to embodiments of the inventive concepts.

The wireless communication apparatus 100 may be fixed or mobile, and may be referred to as any apparatuses capable of transmitting and receiving data, and/or control information, by wirelessly communicating with a plurality of networks. For example, the wireless communication apparatus 100 may be referred to as a terminal, terminal equipment, a terminal device, a mobile station (MS), a mobile terminal (MT), a user terminal (US), a subscriber station (SS), a wireless device, a handheld device, and/or the like.

Referring to FIG. 1, the wireless communication apparatus 100 may include an application processor 120 and/or a modem processor 140.

The application processor 120 may include an Original Equipment Manufacturer (OEM) application 122 based on RCS, and/or a native application 124 based on RCS. A native application refers to an application developed for use on a particular platform or device, and is optimized or configured for a device using a particular platform, and thus is advantageous in accessing system resources and has an advantage that there is no restriction on access rights to native services. On the contrary, an OEM application refers to an application developed to be downloaded and used regardless of platform or device, may have limited access to native services, and may be accessed only through a platform standard Application Programming Interface (API). The OEM application 122 may have a Session Initiation Protocol (SIP) stack therein.

The application processor 120 may include a native service module 126 and/or a SIP transport adapter 128.

The native service module 126 may be a module that provides an API to an end of an upper application for implementing an IMS function. For example, the OEM application 122 may be connected to the native service module 126 to support single registration, and the OEM application 122 may receive a provisioning service (e.g., an RCS provision operation may be performed for/on the OEM application 122, for example, in response to an RCS service request from the OEM application 122) through the connection.

The provisioning service is a service related to preparation for service of an RCS function, and may include, as a non-limiting example, one of an IMS registration, Generic Bootstrapping Architecture (GBA) Authentication, Presence using an Address Book, User-Capability Discovery, Contact List, and/or Auto-Configuration. A particular provisioning service may include a presence function for RCS-enabled user management, and in the presence function, information included in a SIP message header related to presence and content on error handling may be different from each other for each item requested by an operator.

The SIP transport adapter 128 is defined as a module that connects and manages the OEM application 122 and a SIP transport layer 144 when a SIP signaling is used to control a SIP session. The SIP session may be a session supporting the RCS function.

The modem processor 140 may include a SIP stack 142 and/or a SIP transport interface 148.

The SIP stack 142 may be a module including the SIP transport layer 144. The SIP transport layer 144 may process the transmission of a transaction message in the SIP stack 142, and may support functions related to syntax conversion, packet encryption, and tunneling for SIP messages. In embodiments of the inventive concepts, the SIP transport layer 144 of the modem processor 140 may have a structure that cooperates with a SIP transaction layer of the OEM application 122.

The SIP transport interface 148 may provide a path connected from the OEM application 122 to the SIP transport layer 144 such that the OEM application 122 may selectively open a session for the RCS function. That is, due to the SIP transport interface 148, the OEM application 122 may initiate SIP signaling for the RCS function.

According to embodiments, data transmitted through this path (e.g. the path from the OEM application 122 to the SIP transport layer 144) may include a SIP transaction layer message generated by the OEM application 122. In addition, the data transmitted through this path may include a Session Description Protocol (SDP) body encoded according to embodiments. The RCS function that the OEM application 122 intends to replace with this path may correspond to, as a non-limiting example, one of a Standalone Message, an Enriched Call, a Chatbot, a Group-Chat, a File Transfer, and/or GBA authentication, which use a basic protocol such as SIP, Message Session Relay Protocol (MSRP), Real-time Transport Protocol (RTP), Hypertext Transfer Protocol (HTTP)/Hypertext Transfer Protocol Secure (HTTPS), and/or the like.

In embodiments of the inventive concepts, the SIP transport adapter 128 of the application processor 120 and the SIP stack 142 of the modem processor 140 may be operate in a Dual-Subscriber Identity Module (SIM) Dual-Standby (DSDS) device or a Dual-SIM Dual-Active (DSDA) device supporting a multi-stack. For multiple activated applications considering dual SIM, the SIP transport layer 144 may simultaneously or contemporaneously process SIP messages in parallel through unique classification such as a stack ID, a call-ID, a branch-value, and/or the like.

Figure 2:
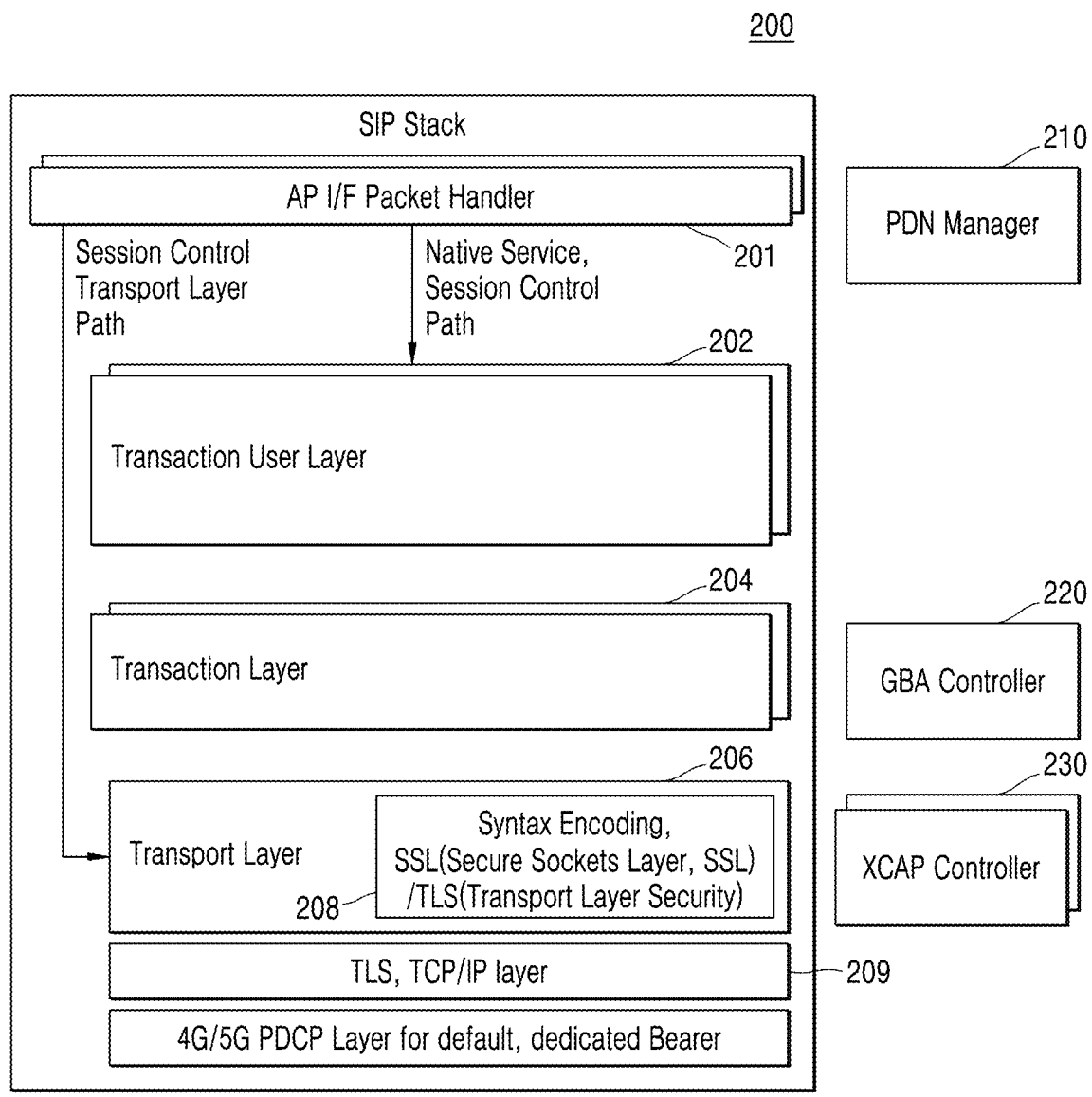
FIG. 2 is a diagram of an internal structure and a peripheral device of a Session Initiation Protocol (SIP) stack of a modem processor according to embodiments of the inventive concepts.

FIG. 2 is a diagram of an internal structure and a peripheral device of a SIP stack 200 of a modem processor according to embodiments of the inventive concepts.

In detail, the SIP stack 200 included in a modem processor may be a module including a SIP transaction user layer 202, a SIP transaction layer 204, and/or a SIP transport layer 206. For example, a SIP transaction user handler 146 in FIG. 1, which defined as the sum (e.g., combination) of the SIP transaction user layer 202 and the SIP transaction layer 204, may be interfaced with the application processor 120 in FIG. 1 to process various requests linked to a modem in relation to an IP multimedia subsystem (IMS) network framework. The SIP transaction user handler 146 may include a small module (SIP API) 201 that connects SIP messages of an application, the SIP transaction user layer 202, and/or the SIP transaction layer 204, and the small module 201 may process database reuse of an application and verify messages according to operator demands A message may be transmitted transparently through the SIP transaction user layer 202, the SIP transaction layer 204, the SIP transport layer 206, and/or a Transmission Control Protocol (TCP)/Internet Protocol (IP) layer 209.

According to embodiments of the inventive concepts, when it is determined whether an encryption protocol between servers, systems, and/or application programs operating through a network is a secure socket layer (SSL) or transport layer security (TLS) as a result of IMS single registration to be described below, an OEM application may be provided with an appropriate Secured IMS service by a library 208 inside the SIP transport layer 206. According to embodiments, the library 208 may be stored in a memory of the wireless communication device and may include data regarding various Secured IMS services.

In addition, when the SIP transport layer 206 detects that a newly opened session is related to an RCS service, the SIP transport layer 206 may transmit a message to the OEM application without modifying a downlink path.

The modem processor may include several devices around the SIP stack 200.

In detail, the modem processor may include a packet data network (PDN) manager 210 that manages IMS PDN activation around the SIP stack 200. For example, the PDN manager 210 may distinguish a stack in a dual SIM environment through PDN information through which a message passed through. To select whether or not a path connected from the OEM application to the SIP transport layer 206 for a received SIP message in a multiple activated dual SIM environment, both a method of using a capability-based configuration table and a table using a message ID history may be supported. To this end, the SIP transport layer 206 may divide categories for messages transmitted from the SIP transaction layer 204 (e.g., creating a capability list), and may store and manage a SIP message history (e.g., a call-ID, a transaction ID (branched-value)).

The modem processor may also include a GBA controller 220 in charge of a GBA function around the SIP stack 200. For GBA authentication, an authentication value through a SIM may be used when accessing an HTTP server in common with an application processor and a modem processor, an API may be provided through the SIP transport adapter 128 to share GBA authentication with an OEM application. According to embodiments, the GBA controller 220 may be positioned in the application processor.

Additionally, the modem processor may include an extensible markup language (XML) configuration access protocol (XCAP) controller 230 around the SIP stack 200.

The XCAP controller 230 is a device used in an IMS service to access a configuration server using the HTTP protocol and additional services.

FIG. 3 is a flowchart schematically illustrating a method of operating a SIP transport layer using a SIP stack according to embodiments of the inventive concepts.

In detail, FIG. 3 is a flowchart 300 illustrating an example of operations of the application processor 120 including the OEM application 122 and the native service module 126, the modem processor 140 including the SIP transaction user layer 202 and the SIP transport layer 206, and/or a 3rd Generation Partnership Project (3GPP) network 324 including a server 326. Hereinafter, an operation method according to embodiments using a SIP stack will be described.

The wireless communication apparatus 100 including the application processor 120 and the modem processor 140 may communicate with the 3GPP network 324. For example, the wireless communication apparatus 100 may communicate with the 3GPP network 324, which is based on IMS, according to a 5th Generator (5G) system, a 5G New Radio (NR) system, a Long Term Evolution (LTE) system, a Code Division Multiple Access (CDMA) system, a Global System for Mobile Communications (GSM) system, a Wireless Local Area Network (WLAN), and/or any other Radio Access Technology (RAT). The 3GPP network 324 may include the server 326 communicating with the wireless communication apparatus 100.

When an input for a user of the wireless communication apparatus 100 to initiate an RCS service using the OEM application 122, is given to (e.g., received by) the wireless communication apparatus 100, the OEM application 122 requests the native service module 126 for items (e.g., profile) used for initiating the RCS service (S302). For example, the items used for initiating the RCS service may include whether a multi-SIP stack is used. The native service module 126, which has received a request of the OEM application 122, may simultaneously or contemporaneously reflect a function requested by the OEM application 122 and a function requested by the native service module 126 as UE capability, while performing IMS single registration (S304).

The native service module 126 transmits, to the server 326 of the 3GPP network 324, a request for registration through the SIP transaction user layer 202 and the SIP transport layer 206 of the modem processor 140 (S304), and receives a response indicating the request for registration is normally registered from the server 326 of the 3GPP network 324 (S306).

The native service module 126 is ready to be used (S308), and accordingly, a native application 328 may use the RCS service for an original intention of using a native service.

The native service module 126 shares SIP configuration parameter information with the OEM application 122 based on the performed IMS single registration (S310). The SIP configuration parameter information may include SIP header tag information to be used by the SIP stack on an application-side.

The native application 328 may open a session for the original intention and exchange media data with the server 326 by using a dedicated bearer 330 (S312).

As a result of the IMS single registration, the OEM application 122 may also open a session and exchange media data with the server 326 by using the dedicated bearer 330 (S314). In this case, the media data may be RCS media data for an RCS function.

The OEM application 122 may use (e.g., re-use) a provisional service through a separate RCS device API (S316). In addition, the OEM application 122 may directly control a session for the RCS function through SIP signaling through a SIP transport adapter and a SIP transport interface, unlike a method in the art described above (S318). Thereafter, a router controller 130 (e.g., included in the application processor 120 as depicted in FIG. 1) may adjust a router table to access an opened dedicated bearer (S320), and the OEM application 122 may exchange the RCS media data with the server 326 through the dedicated bearer 330 (S322). According to embodiments, the wireless communication apparatus 100 may generate a communication signal corresponding to the RCS media data (e.g., by demodulating, decoding, etc., the communication signal), and transmit the communication signal to the server 326 via the dedicated bearer 330. According to embodiments, the wireless communication apparatus 100 may receive a communication signal from the server 326 via the dedicated bearer 330, and may access RCS media data corresponding to the communication signal (e.g., by demodulating, decoding, filtering, etc., the communication signal).

FIG. 4 is flowchart illustrating a synchronization method of initializing a SIP transport layer and for IMS single registration, according to embodiments of the inventive concepts.

The wireless communication apparatus 100 according to embodiments of the inventive concepts may be initialized for SIP-based SIP transmission at the time of initial booting. In detail, FIG. 4 shows an operation of synchronizing two SIP stacks with each other for performing IMS single registration together with the SIP transaction layer in a SIP stack of the OEM application 122 (e.g., a SIP stack of the application processor 120) while a SIP stack of the modem processor 140 is initialized to a role of a native SIP stack, when the SIP stack of the OEM application 122 and the SIP stack of the modem processor 140 exist. Hereinafter, an operation method according to embodiments of inducing IMS single registration will be described.

When the wireless communication apparatus 100 is booted by a user, the OEM application 122 may perform initialization of transmitting, to the native service module 126, parameters related to category On/Off conditions for each RCS function, or the like, that the OEM application 122 intends to set (S402). The native service module 126, which has received the parameters related to category On/Off conditions for each RCS function or the like, maintains capability information through a capability operation, which is one of the provisional services (e.g., performing the RCS provision operation). Through such a series of operation, the native service module 126 may hold both information on the RCS function that the OEM application 122 intends to set and information on the RCS function performed by the native application 124. Thereafter, the application processor 120 sets a default PDN and an IMS PDN. Here, the default PDN generally refers to an IP network allocated from a P-GW of a core for services using the Internet network, and the IMS PDN refers to an IP network for using IMS services such as HD Voice or the like. When the application processor 120 succeeds in setting a PDN, the native service module 126 activates the set PDN (S404). According to embodiments, the activated PDN may be a default PDN for the Internet, an IMS PDN for single registration, or another PDN.

The native service module 126 transmits capability information included in parameter information received from the OEM application 122 together with a PDN setup related message (Setup PDN Message) to the SIP transaction user (SIP-TU) handler 146 of the modem processor 140, and requests IMS single registration (S406). Based on the received information, the modem processor 140 performs IMS single registration, and at the same time or contemporaneously, generates a table determining a SIP message in the SIP transport layer 144 is a path transmitted from the OEM application 122 or a path transmitted from the native application 124. According to embodiments, whether the SIP message is a path transmitted from the OEM application 122 or a path transmitted from the native application 124 may be classified into an RCS functional unit of an application. According to embodiments, for the same RCS function or similar RCS functions, a path may be selected by classifying a path transmitting the SIP message in real time. A path through which a SIP message in the SIP transport layer 144 is transmitted from the OEM application 122 may be referred to as an App Path, and a path through which a SIP message in the SIP transport layer 144 is transmitted from the native application 124 may be referred to as a native path.

Table 1 shows an example of information on a combination of 64-bit mask value for capability of each RCS function and a transmission path of a SIP message for each function.

TABLE 1

| Field | Length | Description |
| --- | --- | --- |
| featureMap | 10 (Array of size 2) | Map of clientId and featureBitmask typedef struct { U8 client Id;//RCS_APP = 1, NATIVE_APP = 2 U64 featureBitMask; }IsitAimsfeatureMap; |

According to embodiments of the inventive concepts, by delivering information as shown in [Table 1], the combination of the 64-bit mask value for the capability of each RCS function and the transmission path of a SIP message for each other may be informed, and based on this, IMS single registration and the transmission path may be determined. For example, among RCS functions, Chatbox may be used as App Path, and among RCS functions, Enriched Call may be declared to be used as Native Path.

Table 2 shows an example of a method for classifying RCS functions according to a Global System for Mobile Communications Association (GSMA) standard at a reception side of a SIP message.

TABLE 2

| RCS function | SIP OPTIONS Tag | SIP Message Tag |
| --- | --- | --- |
| IM | +g.3gpp.iariref = "urn%3Aurn-%3A3gpp-application.ims.iari.rcse.im" | Standalone Messaging SIP MESSAGE (in case of Pager Mode CPM Standalone Messages) P-Asserted-Service: urn:urn-7:3gpp-service.ims.icsi.oma.cpm.msg or urn:urn-7:3gpp- |

TABLE 2-continued

| RCS function | SIP OPTIONS Tag | SIP Message Tag |
|---|---|---|
| | | service.ims.icsi.oma.cpm.msg.group and not carrying content of the type "message/imdn + xml"; or INVITE (in case of Large Message Mode CPM Standalone Messages) P-Asserted-Service: urn:urn-7:3gpp-service.ims.icsi.oma.cpm.largemsg or urn:urn-7:3gpp-.service.ims.icsi.oma.cpm.largemsg.group Group Chat SIP INVITE, SUBSCRIBE and REFER (in case of chat sessions) P-Asserted-Service: urn:urn-7:3gpp-service.ims.icsi.oma.cpm.session.group |
| ChatBot | +g.3gpp.icsi-ref = "urn%3Aurn-7%3A3gpp-service.ims.icsi.gsma.rcs.extension" | SIP INVITE Accept-Contact header field containing feature tag +g.3gpp.iari-ref = urn%3Aurn-7%3A3gpp-application.ims.iari.rcs.chatbot". |
| FT | +g.3gpp.iari-ref = "urn%3Aurn-7%3A3gpp-application.ims.iari.rcse.ft" | HTTP File Transfer A Chat Message with application/vnd.gsma.rcs-ft-http + xml as the CPIM content-type property is sent in an MSRP session (identified as in 1-to-1 Chat and Group Chat). |
| VoLTE(VoNR)/ViLTE (ViNR) Call | +g.3gpp.icsi-ref = "urn%3Aurn-7%3A3gpp-service.ims.icsi.mmtel"; video | IP Voice Call SIP INVITE P-Asserted-Service: urn:urn-7:3gpp-service.ims.icsi.mmtel Accept-Contact and Contact header fields containing the feature tag +g.3gpp.icsi-ref = "urn%3Aurn-7%3A3gpp-service.ims.icsi.mmtel" and only audio media in SDP in 200 OK response IP Video Call SIP INVITE P-Asserted-Service: urn:urn-7:3gpp-service.ims.icsi.mmtel Accept-Contact and Contact header fields containing the feature tag +g.3gpp.icsi-ref = "urn%3Aurn-7%3A3gpp-service.ims.icsi.mmtel" Accept-Contact and Contact header fields containing the "video" capability indication and audio and video media in SDP in 200 OK response |

Referring to Table 2, for example, when the reception side of a SIP message may classify the capability using an Accept-Contact and Contact header included in a SIP OPTIONS Tag, and in the case of the RCS functions, the reception side of a SIP message may classify the functional category using a P-Asserted-Service field included in a SIP Message Tag. In addition, the SIP Message Tag may be, for example, INVITE or MESSAGE.

When SIP single registration is completed (S408), the native service module 126 transmits, to the OEM application 122, a corresponding notification (REG_NTF) and configuration parameters (SIP_CFG_IND) to be used by the SIP stack of the OEM application 122 (S408 and S410).

When a situation in which a SIP transmission profile of the OEM application 122 is changed in an environment using multiple RCS applications occurs, as in S402, the OEM application 122 newly performs an initialization operation of transmitting, to the native service module 126, parameters related to the category On/Off conditions or the like for each RCS function that the OEM application 122 intends to set (S412). According to embodiments, a situation in which a SIP transmission profile of an OEM application is changed in an environment using multiple RCS applications may correspond to a case where an RCS function to be used in the OEM application is changed, or a case where another OEM application is executed or a running OEM application is terminated.

After the newly initialization (and/or reset) operation is performed (S412 and S414, or collectively 420), IMS single registration is executed again through operations S404 to S410.

Figure 5A:
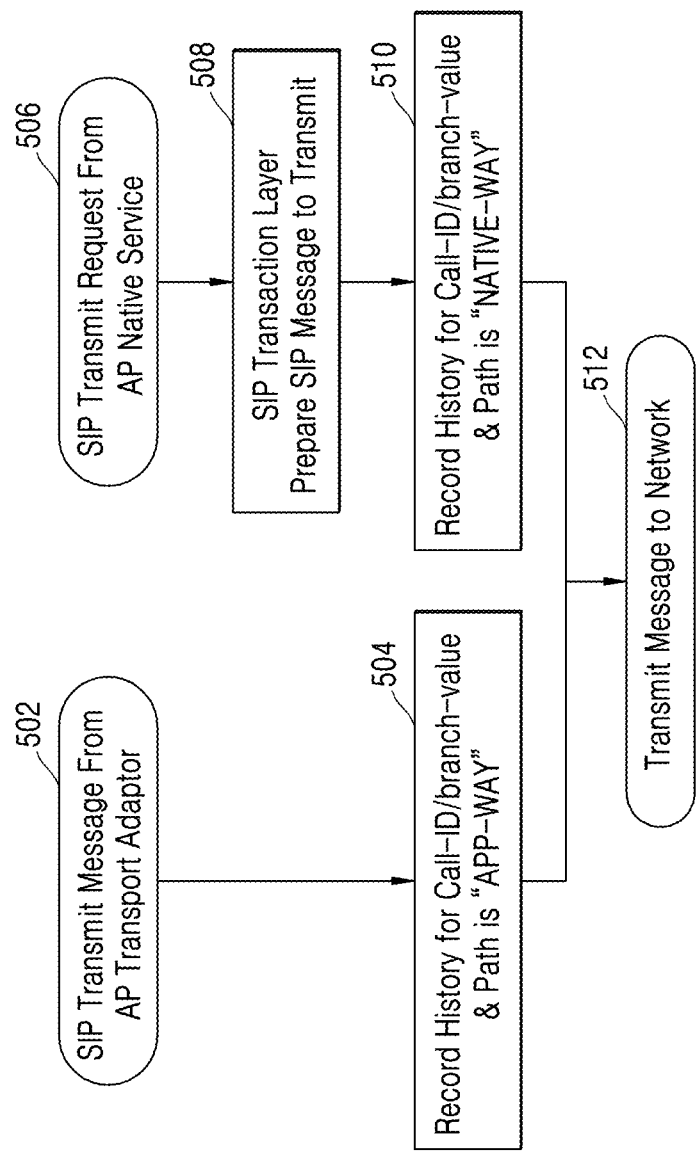
FIGS. 5A and 5B are flowcharts illustrating methods of selecting a path through which a SIP message is transmitted and received, according to embodiments of the inventive concepts.
Figure 5B:
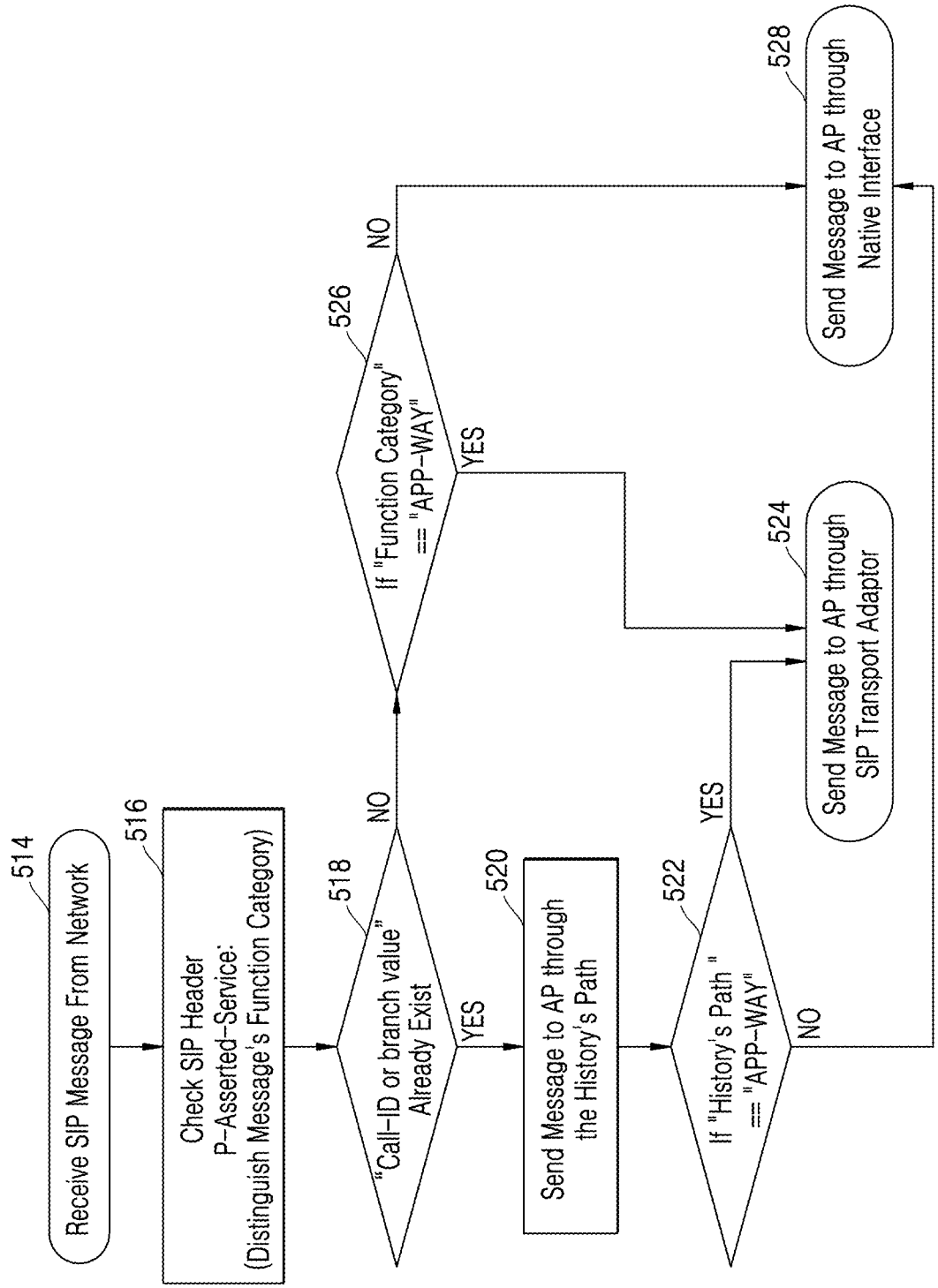

FIGS. 5A and 5B are flowcharts illustrating methods of selecting a path through which a SIP message is transmitted and received, according to embodiments of the inventive concepts.

In detail, FIG. 5A illustrates a method of distinguishing a case where a SIP message in the SIP transport layer 144 is received from the SIP transport adapter 128 or a case where a SIP message transmission request is received from the native service module 126 and transmitting a SIP message to a server according to a path, and FIG. 5B illustrates a method of selecting and transmitting the SIP message through a path through the SIP transport adapter 128 or a path through the native service module 126 when the SIP message is received from the server.

In embodiments of FIG. 5A, the SIP transport layer 144 may be initialized to store paths for each category of RCS functions intended to be used by the OEM application 122.

When the SIP message in the SIP transport layer 144 is received from the SIP transport adapter 128 (S502), the SIP transport layer 144 stores a path history (e.g., a call-ID, a transaction ID (branched-value)) for returning a response and stores a path as "APP-WAY" (S504). Then, the SIP transport layer 144 transmits the SIP message to the server 326 (S512). According to embodiments, the path history may be stored in a memory of the wireless communication apparatus 100. According to embodiments, the SIP message is received from the OEM application 122 via the SIP transport adapter 128 through a TCP/IP session.

On the contrary, when the SIP transport layer 144 receives a SIP message transmission request from the native service module 126, (S506), the SIP transaction layer 204 prepares to transmit the SIP message (S508). In this case, the SIP transport layer 144 stores a path history (e.g., a call-ID, a transaction ID (branched-value) for returning a response and stores a path as "NATIVE-WAY" (S510). Then, the SIP transport layer 144 transmits the SIP message to the server 326 (S512). According to embodiments, the SIP message is received from the native application 124 via native service module 126 through a TCP/IP session.

According to embodiments, when the RCS functions that the OEM application 122 intends to use are in the same category or similar categories, the SIP transport layer 144 may save both "APP-WAY" and "NATIVE-WAY" paths.

In embodiments of FIG. 5B, when a SIP message is received from a server (e.g., the server 326) (S514), the SIP transport layer 144 may check P-Asserted-Service included in a SIP header to classify the category of the RCS function of the SIP message (S516).

It is determined whether a SIP message transmission history (e.g., a call-ID and a transaction ID (branched-value)) exists (S518), and when the history (e.g., a call-ID and a transaction ID (branched-value)) exists, the SIP message is transmitted to the application processor 120 by selecting a path according to a stored history (S520).

When a path according to the stored history is determined as "APP-WAY" (S522), the SIP transport layer 144 transmits the SIP message to the application processor 120 through the SIP transport adapter 128 (S524). When a path according to the stored history is determined as "NATIVE-WAY" instead of "APP-WAY" (S522), the SIP transport layer 144 transmits the SIP message to the application processor 120 through the native service module 126 (S528).

It is determined whether a SIP message transmission history (e.g., a call-ID and a transaction ID (branched-value)) exists (S518), and when the history (e.g., a call-ID and a transaction ID (branched-value)) does not exist and a path according to a stored history is determined as "APP-WAY" (S526), the SIP transport layer 144 transmits the SIP message to the application processor 120 through the SIP transport adapter 128 (S524).

It is determined whether a SIP message transmission history (e.g., a call-ID and a transaction ID (branched-value)) exists (S518), and when a history (e.g., a call-ID and a transaction ID (branched-value)) does not exist and a path according to a stored history is determined as "NATIVE-WAY" instead of "APP-WAY" (S526), the SIP transport layer 144 transmits the SIP message to the application processor 120 through the native service module 126 (S528).

According to embodiments, when the RCS functions that the OEM application 122 intends to use are in the same category or similar categories, the SIP transport layer 144 may save both "APP-WAY" and "NATIVE-WAY" paths.

In this way, according to embodiments of FIG. 5, the modem processor 140 of the wireless communication apparatus 100 may first identify a path through the SIP message transmission history and prepare for a case of using the same RCS function (or similar RCS functions) at the same time (or contemporaneously) in an environment using multiple RCS applications, and when a history does not exists, may determine that a new reception is made and select a path based on a setting table according to an RCS function category.

Figure 6:
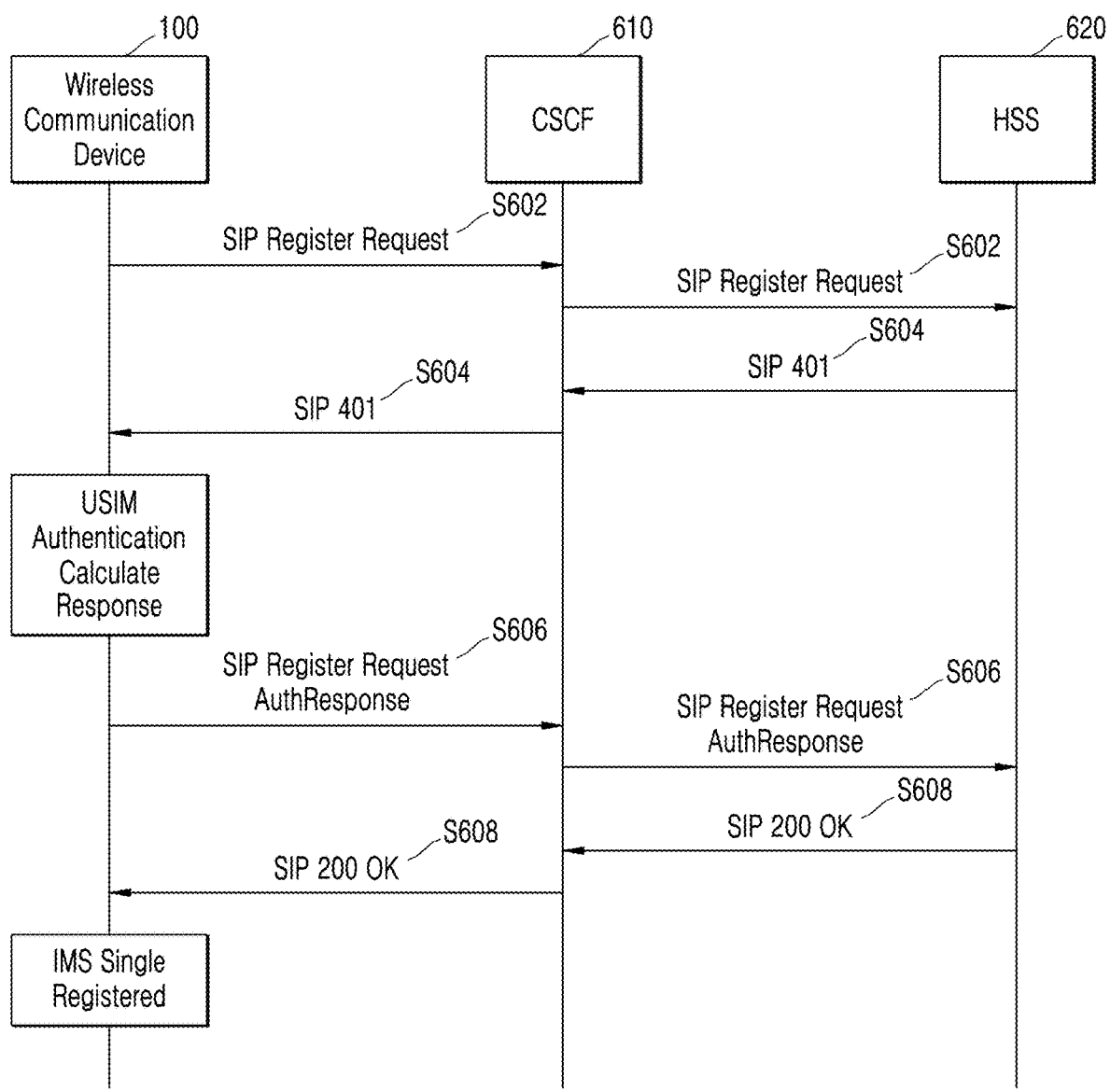
FIG. 6 is a flowchart schematically illustrating a method of performing IMS single registration, according to embodiments of the inventive concepts.

FIG. 6 is a schematic flowchart showing a method of performing IMS single registration integrated with Voice over Long-Term Evolution (VoLTE)/RCS.

In detail, FIG. 6 illustrates an example of a method performing IMS single registration performed after the synchronization method of initializing a SIP transport layer and for IMS single registration of FIG. 4 for inducing IMS single registration, and is described from the perspective of a network instead of an operation of the wireless communication apparatus 100.

Referring to FIG. 6, the wireless communication apparatus 100 transmits a SIP registration message to a home subscriber server (HSS) 620 through a call session control function (CSCF) 610 for IMS registration (S602). IMS registration information included in the SIP registration message may include at least one of International Mobile Subscriber Persistent Identity (IMPI) and IP Multimedia Public identity (IMPU). The CSCF 610 may include a proxy call session control function (P-CSCF) and an interrogating call session control function (I-CSCF) as a session control function block. Herein, the P-CSCF may correspond to an IMS service proxy server for each communication service provider.

The HSS 620 transmits a SIP 401 (unauthorized) message to the wireless communication apparatus 100 through the CSCF 610 as a response to the registration request of the wireless communication apparatus 100. The wireless communication apparatus 100 retransmits the SIP registration message including information used for the RCS service to the HSS 620 through the CSCF 610 (S606). The HSS 620 transmits a SIP 200 OK message to the wireless communication apparatus 100 through the CSCF 610 in response to a re-registration request of the wireless communication apparatus 100, and the IMS single registration is completed.

Table 3 illustrates an example of a flow of a SIP registration message transmitted by the wireless communication apparatus 100 in S602 and S606.

TABLE 3

| | | | | | |
|---|---|---|---|---|---|
| 18:33:21.951 | 18:34:17.004053 | ST1 | SIP | UL.Request | REGISTER |
| 18:33:22.706 | 18:34:17.756891 | ST1 | SIP | DL.Response | 401 Unauthorized |
| 18:33:22.811 | 18:34:17.892237 | ST1 | SIP | UL.Request | REGISTER |
| 18:33:23.533 | 18:34:18.598810 | ST1 | SIP | DL.Response | 200 OK |
| 18:33:23.534 | 18:34:18.611841 | ST1 | SIP | UL.Request | SUBSCRIBE |
| 18:33:23.877 | 18:34:18.942621 | ST1 | SIP | DL.Response | 200 OK |
| 18:33:25.232 | 18:34:20.311396 | ST1 | SIP | DL.Request | NOTIFY |
| 18:33:25.235 | 18:34:20.317743 | ST1 | SIP | UL.Response | 200 OK |
| 18:33:26.683 | 18:34:21.737970 | ST1 | SIP | UL.Request | PUBLISH |
| 18:33:26.935 | 18:34:22.016748 | ST1 | SIP | DL.Response | 200 OK |

Table 4 illustrates an example of some contents of the SIP registration message transmitted by the wireless communication apparatus 100 in S602 and S606.

REGISTER sip:msg.pc.t-mobile.com SIP/2.0
From: <sip:310260123456789@ims.mnc260.mcc310.3gppnetwork.org>;tag=b3a8594f
To: <sip:310260123456789@ims.mnc260.mcc310.3gppnetwork.org>
Contact:
<sip:310260123456789@[fc01:bbbb:cdcd:efel::1]:49155>;audio;video;+g.3gpp.sms
ip;+g.3gpp.icsi-ref="urn%3Aurn-7%3A3gpp-service.ims.icsi.mmtel,urn%3Aurn-
7%3A3gpp-service.ims.icsi.oma.cpm.session,urn%3Aurn-7%3A3gpp-service.ims.icsi.oma.cpm.msg,
urn%3Aurn-7%3A3gpp-
service.ims.icsi.oma.cpm.filetransfer";+g.3gpp.iari-ref="urn%3Aurn-7%3A3gpp-
application.ims.iari.rcs.geopush,urn%3Aurn-7%3A3gpp-application.ims.iari.rcs.geosms";reg-
id=1;+sip.instance="<urn:gsma:imei:35069520-012395-0>"
Call-ID: 90166a13d1de4dc@fc01:bbbb:cdcd:efel::1W The SIP registration message is written and transmitted in an American National Standards Institute (ANSI) text format conforming to a Multipurpose Internet Mail Extensions (MIME) type standard. Referring to Table 4, among the content of the SIP registration message, a header portion of Contact may mean a combination of RCS functions requested by the wireless communication apparatus 100, according to embodiments.

Table 5 illustrates an example list of some of values included in in the Contact among the contents of the SIP registration message.

TABLE 5

| Mobile Communication Device services | Capability Tags |
|---|---|
| AUDIO CALL | audio |
| VIDEO CALL | video |
| SMS | +g.3gpp.smsip |
| VoLTE FUNCTION | +g.3gpp.cs-voice, |
| | +g.3gpp.icsi-ref = "urn%3Aurn-7%3A3gpp-service.ims.icsi.mmtel, |
| | +g.gsma.callcomposer, |
| | +g.3gpp.srvcc-alerting, |
| | +g.3gpp.mid-call, |
| | +g.3gpp.cs2ps-srvcc, |
| | ... |
| RCS FUNCTIONS in +g.3gpp.icsi-ref | +g.3gpp.icsi-ref = urn%3Aurn-7%3A3gpp-service.ims.icsi.oma.cpm.session, |
| | urn%3Aurn-7%3A3gpp-service.ims.icsi.oma.cpm.msg, |
| | urn%3Aurn-7%3A3gpp-service.ims.icsi.oma.cpm.largemsg, |
| | urn%3Aurn-7%3A3gpp-service.ims.icsi.oma.cpm.filetransfer, |
| | urn%3Aurn-7%3A3gpp-service.ims.icsi.oma.cpm.systemmsg' |
| | 3gpp-service.ims.icsi.oma.cpm.msg.group, |
| | 3gpp-service.ims.icsi.oma.cpm.largemsg.group, |
| | urn%3Aurn-7%3A3gpp-application.ims.iari.rcs.botspam, |
| | urn:urn-7:3gpp-service.ims.icsi.gsma.callcomposer, |

TABLE 5-continued

| Mobile Communication Device services | Capability Tags |
|---|---|
| | urn%3Aurn-7%3A3gpp-service.ims.icsi.gsma.callunanswered, urn%3Aurn-7%3A3gpp-service.ims.icsi.gsma.sharedmap, urn%3Aurn-7%3A3gpp-service.ims.icsi.gsma.sharedsketch, ... |
| RCS FUNCTIONS in +g.3gpp.iari-ref | +g.3gpp.iari-ref = urn%3Aurn-7%3A3gpp-application.ims.iari.rcs.fthttp, urn%3Aurn-7%3A3gpp-application.ims.iari.rcs.ftthumb, urn%3Aurn-7%3A3gpp-application.ims.iari.rcs.geopush, urn%3Aurn-7%3A3gpp-application.ims.iari.rcs.geosms urn%3Aurn-7%3A3gpp-application.ims.iari.rcs.mnc000.mcc460.offlinemsg urn%3Aurn-7%3A3gpp-application.ims.iari.rcs.chatbot urn%3Aurn-7%3A3gpp-application.ims.iari.rcs.chatbot.sa urn%3Aurn-7%3A3gppapplication.ims.iari.rcs.ftsms org.3gpp.urn%3Aurn-7%3A3gpp-application.ims.iari.rcs.closedgroupchat, ... |
| IMEI | +sip.instance = "<urn:gsma:imei:35069520-012395-0>" |

The SIP registration message transmitted by the wireless communication apparatus 100 in S602 and S606 may include information related to capability as shown in Table 5 according to whether or not IMS single registration is supported.

Figure 7:
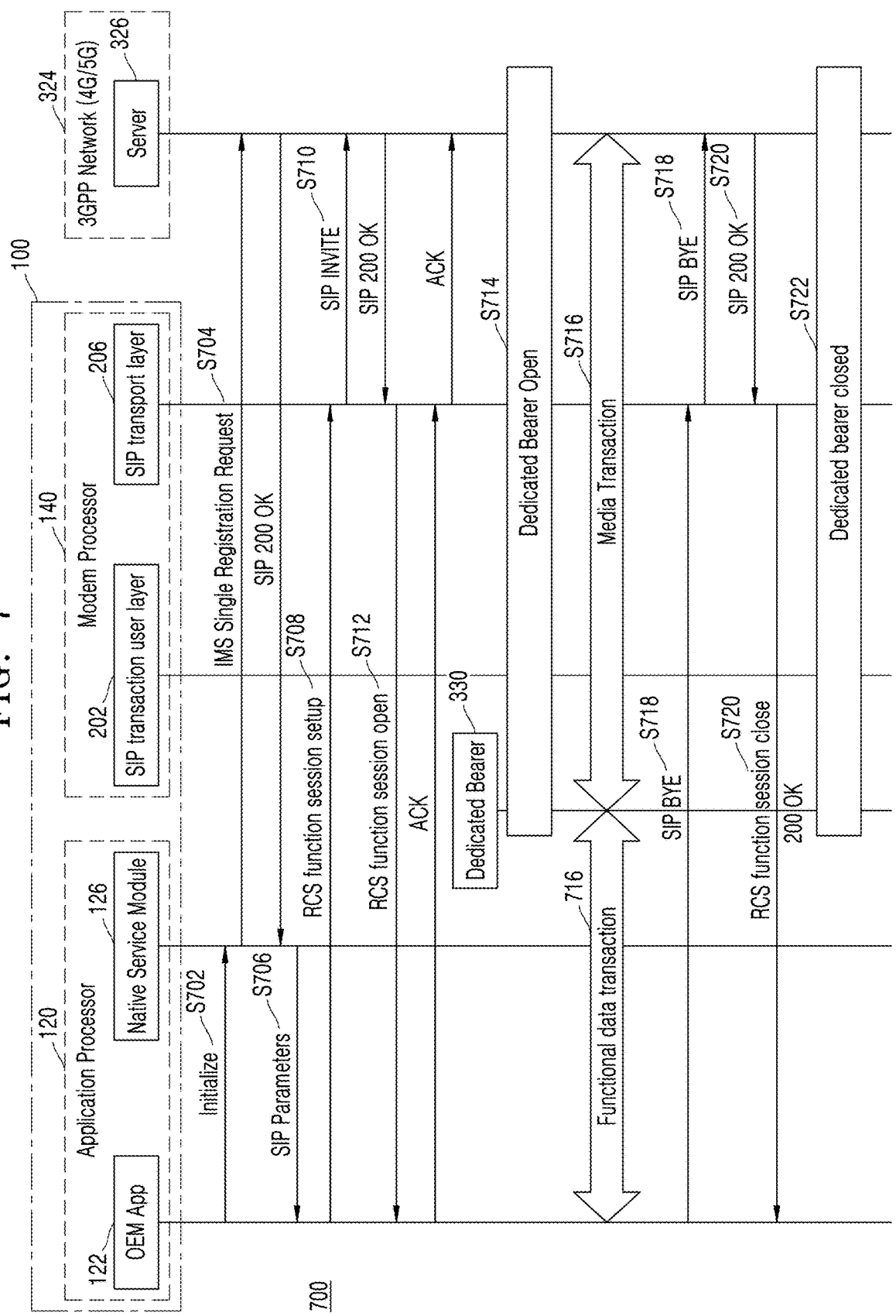
FIG. 7 is a flowchart schematically illustrating a method, after performing IMS single registration, of operating a SIP transport layer using a dedicated bearer, according to embodiments of the inventive concepts.

FIG. 7 is a flowchart illustrating a method of operating a SIP transport layer using a dedicated bearer after IMS single registration.

In detail, FIG. 7 is a diagram illustrating a detailed example of FIG. 3, and an operation of connecting a network to a session by using a dedicated bearer, among the operating method of the SIP transport layer of FIG. 3, will be described in detail.

When an input for (e.g., from) the user of the wireless communication apparatus 100 to initiate an RCS service using the OEM application 122, is given to the wireless communication apparatus 100, the OEM application 122 performs an initialization operation of requesting the native service module 126 with items corresponding to initiation of the RCS service (S702). In S702, for example, initialization parameters transmitted from the OEM application 122 to the native service module 126 may include an "RCS_Feature-Support_t 64bit" value including information on an RCS function that the OEM application 122 intends to use and ID information issued by the OEM application 122. In detail, the ID information issued by the OEM application 122 may be a universally unique identifier (UUID) or any type of ID information based on the UUID.

After the initialization operation, although not illustrated in FIG. 7, the native service module 126 activates a PDN through a PDN manager of the modem processor 140 for single IMS registration. In embodiments, after confirming that a state of the wireless communication apparatus 100 is LTE Camp On, the native service module 126 may request a telephony data connection tracker with PDN activation when an IMS PDN has not yet been activated. When the PDN is activated, for example, the IMS single registration is triggered after recognizing that the IMS PDN has been normally activated. According to embodiments, the activated PDN may be a default PDN for the Internet, an IMS PDN for single registration, or another PDN.

The application processor 120 combines information obtained in S702, for example, the items used for the OEM application 122 to initiate the RCS service, IMS PDN selection information, or the like, and transmits the request for IMS single registration to the modem processor 140 (S704). The operation of performing IMS single registration has been described in detail in FIG. 6, and thus is omitted here. When the IMS single registration is completed, the OEM application 122 receives SIP configuration parameter information (S706). In embodiments, the SIP configuration parameter information may include information received from the 3GPP network 324 as a result of single IMS registration. For example, the information received from the 3GPP network 324 may include synchronization information when operating with multiple SIP stacks.

The OEM application 122 requests session setting in a form of a SIP INVITE message to use the RCS function (S708). In this case, the OEM application 122 may directly use the SIP transport layer 206 of the modem processor 140. Although not illustrated in FIG. 7, an operation of checking whether the remote user(s), which are connected through a user, are RCS-compatible by using a presence function may be preceded or performed. Because the presence function corresponds to the provisional service, the presence function may be supported through a separate RCS device API.

The SIP transport layer 206 of the modem processor 140 transmits a SIP message to the server 326 in cooperation with the SIP transaction layer of the OEM application 122 (S710). The OEM application 122 receives information on a session for exchanging RCS function data (S712), and the server 326 sets a dedicated bearer (e.g., the dedicated bearer 330) (S714). In the case of IMS single registration, the IMS PDN may use multiple dedicated bearers for Quality of Service (QoS) support. The application processor 120 may adjust or set IP packet routing characteristics through 5 tuple information including a Source address/Source Port/Destination Address/Destination Port/Network type, and the modem processor 140 may control a session based on the dedicated bearer 330. The OEM application 122 uses a SIP transport adapter to access the dedicated bearer 330 and, when information corresponding to the dedicated bearer 330 is transmitted to the router controller 130, receives a TCP/IP socket context ID that may be used in response thereto. Accordingly, the OEM application 122 may communicate with a network through the socket.

The OEM application 122 exchanges media data corresponding to the RCS function with the server 326 (S716).

When the media data exchange is terminated, a SIP signaling request and a response for terminating the session are exchanged between the OEM application 122 and the server 326 (S718 and S720). In this case, setting of the dedicated bearer 330 is terminated by the server 326 (S722).

When a separate SIP stack is used in different RCS applications from each other, the RCS applications may be regarded as multiple registration. In detail, multiple registration, which is not a single registration, refers to a case where a VoLTE service and an RCS service are not integrated and registration is performed individually, and in this case, the OEM application 122 may operate as a general Internet network and may be compatible with the structure of embodiments. For example, the OEM application 122 may inform the native service module 126 of a single registration request excluding the RCS function that the OEM application 122 intends to register separately, and separately registered native services and OEM applications do not interfere with each other. In other words, depending on a network situation, for example, when an IMS network is not available and only the Internet network is available, under conditions in which some functions may not be integrated into a single registration, multiple registrations are possible by dividing not only the OEM application and the native service, but also within the native service, and the inventive concepts are considered not to interfere under these conditions.

Figure 8:
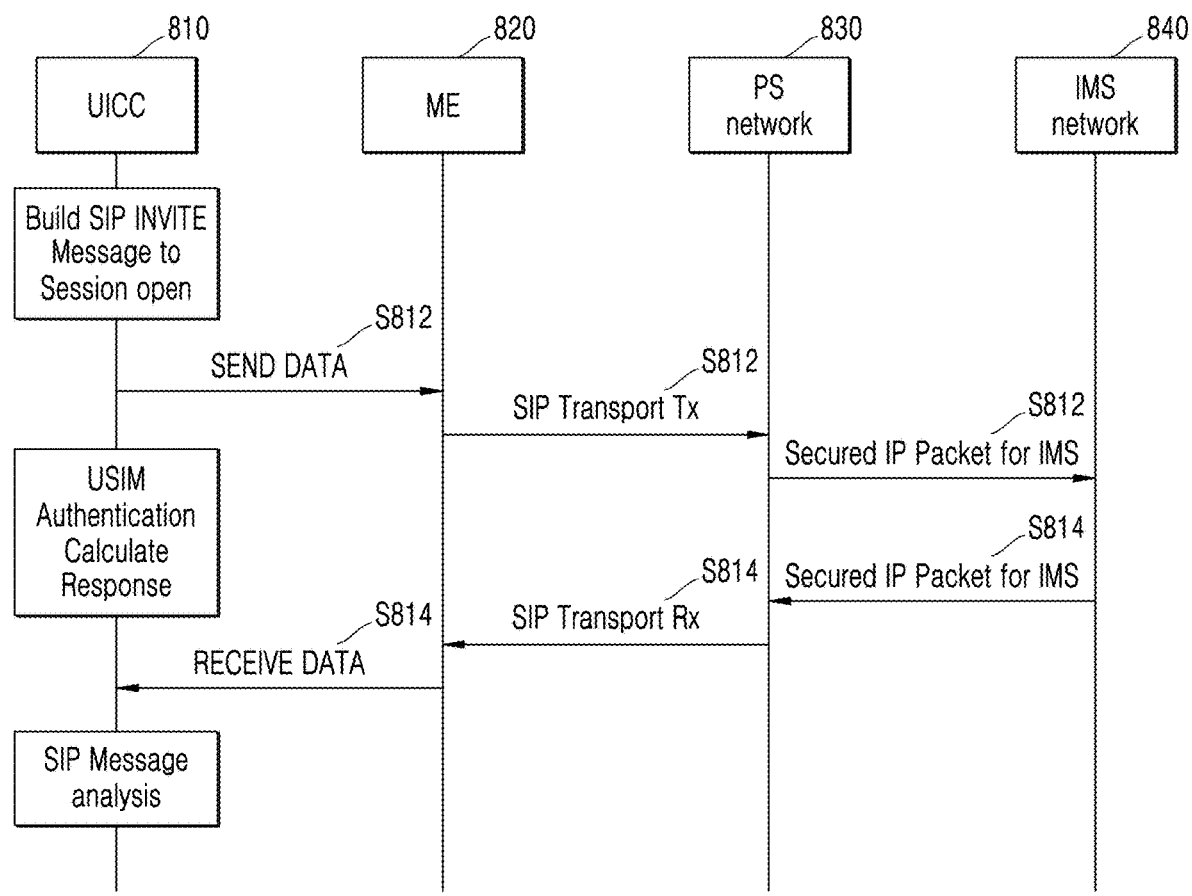
FIG. 8 is a flowchart schematically illustrating a method of providing a Bearer Independent Protocol (BIP) service in a SIM toolkit using a SIP transport layer, according to embodiments of the inventive concepts.

FIG. 8 is a flowchart schematically illustrating a method of providing a bearer independent protocol (BIP) service in a SIM toolkit using the SIP transport layer 144 according to embodiments of the inventive concepts.

The OEM application 122 may communicate with a network using the SIP transport layer 144 by setting an IMS session when there is a request for IMS SIP signaling from a SIM through a SIM-Toolkit 150 supporting the IMS-based protocol. In detail, referring to embodiments according to FIG. 8, a universal integrated circuit card (UICC) 810 transmits data in forms of IP packets through a dedicated bearer to a IMS network 840 (S812) (e.g., via an ME 820 and a packet switched network 830), and when response is received from the IMS network, the SIP transport layer 144 is may recognize that a response has been received using "call-ID" and "branched value", and returns the received response to the SIM-Toolkit 150 (S814).

Conventional devices for accessing network services do not support single registration for OEM RCS applications. In particular, enabling an RCS application involves an understanding of an entire framework and stack of a device. Accordingly, conventional devices only support native RCS applications developed by the manufacturers of the conventional devices. Also, the conventional devices do not permit an OEM RCS application to access native functions that would be used to support single registration for the OEM RCS application. Accordingly, the conventional devices fail to enable single registration for OEM RCS applications.

Further, single registration enables Quality of Service (QoS) support through the existing 3rd Generation Partnership Project (3GPP) network and integrated services (Voice over Long-Term Evolution (VoLTE)/Video over Long-Term Evolution (ViLTE), Voice over New Radio (VoNR)/Video over New Radio (ViNR), Short Message Service (SMS), Rich Communication Suite (RCS)). Therefore, by failing to enable single registration for OEM RCS applications, the conventional devices provide insufficient QoS support for such services.

However, according to embodiments, improved devices are provided that support single registration for OEM RCS applications. In particular, the improved devices may include a Session Initiation Protocol (SIP) transport layer and a SIP transport adapter configured to directly access a SIP transport layer of a modem processor from an application processor performing a Rich Communication Suite (RCS) service of an Original Equipment Manufacturer (OEM) application. Also, the OEM application performing the RCS service in a single registration environment may open an interface to access a native service to exchange data and use some functions to support native-level performance and RCS functions that meet the standards of each provider. Accordingly, the improved devices overcome the deficiencies of the conventional devices to enable single registration for OEM RCS applications and/or provide improved QoS support.

According to embodiments, operations described herein as being performed by the wireless communication apparatus 100, application processor 120, a modem processor 140, the OEM application 122, the native application 124, the native service module 126, the SIP transport adapter 128, the router controller 130, the SIP transport layer 144, SIP stack 142, the SIP transport interface 148, the SIP transaction user handler 146, the SIP stack 200, the SIP transaction user layer 202, the SIP transaction layer 204, the SIP transport layer 206, the small module 201, the TCP/IP layer 209, the PDN manager 210, the GBA controller 220, the XCAP controller 230, the server 326, the RCS device API, the SIP stack of the OEM application 122, the SIP stack of the modem processor 140, the HSS 620, the CSCF 610, the SIM-Toolkit 150, the UICC 810, the ME 820, the packet switched network 830, the IMS network 840 (e.g., a corresponding server) and/or the provision module may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium (e.g., the memory of the wireless communication apparatus 100). A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Embodiments may be described with reference to acts and symbolic representations of operations (e.g., in the form of flow charts, flow diagrams, data flow diagrams, structure diagrams, block diagrams, etc.) that may be implemented in conjunction with modules and/or devices discussed in more detail herein. Although discussed in a particular manner, a function or operation specified in a specific block may be performed differently from the flow specified in a flowchart, flow diagram, etc. For example, functions or operations illustrated as being performed serially in two consecutive blocks may actually be performed concurrently, simultaneously, contemporaneously, or in some cases be performed in reverse order.

It will be understood that when an element is referred to as being "connected" or "coupled" to another element, it may be directly connected or coupled to the other element or intervening elements may be present. According to embodiments, an element referred to as being "directly" connected to another element may be connected without such intervening elements present. As used herein the term "and/or" includes any and all combinations of one or more of the associated listed items.

As described above, embodiments have been disclosed in the drawings and specification. In the present specification, embodiments have been described using specific terms, but these are only used for the purpose of describing the inventive concepts, and are not used to limit the meaning or the scope of the inventive concepts described in the claims. Therefore, those of ordinary skill in the art will realize that various modifications and other equivalent examples are possible from this. Accordingly, the true technical scope of the inventive concepts should be determined by the technical spirit of the appended claims.

While the inventive concepts have been particularly shown and described with reference to embodiments thereof, it will be understood that various changes in form and details may be made therein without departing from the spirit and scope of the following claims.

What is claimed is:

1. A wireless communication method supporting a Rich Communication Suite (RCS) service, the method comprising:

performing an RCS provision operation corresponding to an Original Equipment Manufacturer (OEM) application through an IP Multimedia Subsystem (IMS) native service module in response to an RCS service request of the OEM application, the performing the RCS provision operation including enabling an Internet Protocol (IP) Multimedia System (IMS) single registration by synchronizing a native Session Initiation Protocol (SIP) stack with another SIP stack;

transmitting a first SIP message from a SIP transaction layer of the other SIP stack directly to a SIP transport layer of the native SIP stack via a SIP transport adaptor after the RCS provision operation is completed, the first SIP message including an RCS function connection request;

controlling a session for an RCS function based on the RCS function connection request to obtain a dedicated bearer; and exchanging RCS media data with a network through the dedicated bearer.

2. The wireless communication method of claim 1, further comprising:

providing a SIP configuration parameter to the OEM application based on the IMS single registration.

3. The wireless communication method of claim 2, wherein the SIP configuration parameter comprises a SIP header tag used by the other SIP stack.

4. The wireless communication method of claim 1, wherein the RCS provision operation comprises at least one of an IMS Registration for the RCS function, Generic Bootstrapping Architecture (GBA) Authentication, Presence using an Address Book, User-Capacity Discovery, a Contact List, or Auto Configuration.

5. The wireless communication method of claim 1, wherein the RCS function connection request comprises data related to at least one of a Standalone Message using SIP, an Enriched Call, a Chatbot, a Group-Chat, a File Transfer, or Generic Bootstrapping Architecture (GBA) Authentication.

6. The wireless communication method of claim 1, wherein the controlling the session comprises:

determining whether a second SIP message is transmitted from the OEM application or a native application according to the RCS function, the second SIP message being transmitted through a Transmission Control Protocol (TCP)/Internet Protocol (IP) session.

7. The wireless communication method of claim 6, wherein data transmitted from the OEM application comprises a SIP transaction layer message generated by the OEM application.

8. The wireless communication method of claim 1, wherein the RCS media data is first RCS media data; and the exchanging comprises exchanging the first RCS media data and second RCS media data with the network through the dedicated bearer, the first RCS media data corresponding to the OEM application and the second RCS media data corresponding to a native application.

9. The wireless communication method of claim 1, wherein the other SIP stack corresponds to the OEM application.

10. A wireless communication apparatus supporting a Rich Communication Suite (RCS) service, comprising:

processing circuitry configured to perform an RCS provision operation corresponding to an Original Equipment Manufacture (OEM) application through an IP Multimedia Subsystem (IMS) native service module, the OEM application corresponding to an RCS function, the performance of the RCS provision operation including enabling an Internet Protocol (IP) Multimedia System (IMS) single registration by synchronizing a native Session Initiation Protocol (SIP) stack with another SIP stack, and transmit a first SIP message from a SIP transaction layer of the other SIP stack directly to a SIP transport layer of the native SIP stack via a SIP transport adaptor after the RCS provision operation is completed, the first SIP message including an RCS function connection request; and the SIP transport layer configured to be connected to the OEM application through a SIP transport interface.

11. The wireless communication apparatus of claim 10, wherein the processing circuitry is further configured to transmit a SIP configuration parameter to the OEM application based on the IMS single registration.

12. The wireless communication apparatus of claim 11, wherein the SIP configuration parameter comprises a SIP header tag used by the other SIP stack.

13. The wireless communication apparatus of claim 10, wherein the processing circuitry is configured to exchange media data according to the RCS function with a network through a dedicated bearer.

14. The wireless communication apparatus of claim 13, wherein the processing circuitry is configured to adjust a router table to access the dedicated bearer.

15. The wireless communication apparatus of claim 10, wherein the RCS provision operation comprises at least one of an IMS Registration for the RCS function, Generic Bootstrapping Architecture (GBA) Authentication, Presence using an Address Book, User-Capacity Discovery, a Contact List, or Auto Configuration.

16. The wireless communication apparatus of claim 10, wherein the RCS function comprises at least one of a Standalone Message using SIP, an Enriched Call, a Chatbot, a Group-Chat, a File Transfer, or Generic Bootstrapping Architecture (GBA) Authentication.

17. The wireless communication apparatus of claim 10, wherein the SIP transport layer is configured to determine whether a second SIP message is transmitted from the OEM application or a native application according to the RCS function, the second SIP message being transmitted through a Transmission Control Protocol (TCP)/Internet Protocol (IP) session.

18. The wireless communication apparatus of claim 10, wherein data transmitted from the OEM application comprises a SIP transaction layer message generated by the OEM application.

19. A modem processor supporting a Rich Communication Suite (RCS), comprising:

processing circuitry configured to, perform an RCS provision operation corresponding to an Original Equipment Manufacturer (OEM) application through an IP Multimedia Subsystem (IMS) native service module in response to an RCS service request of the OEM application, the performance of the RCS provision operation including enabling an Internet Protocol (IP) Multimedia System (IMS) single registration by synchronizing a native Session Initiation Protocol (SIP) stack with another SIP stack, and transmit a first SIP message from a SIP transaction layer of the other SIP stack directly to a SIP transport layer of the native SIP stack via a SIP transport adaptor after the RCS provision operation is completed, the first SIP message including an RCE function connection request from the OEM application, and the SIP transport layer being configured to control a session for an RCS function based on the RCS function.

20. The modem processor of claim 19, wherein the SIP transport layer is configured to:

determine whether a second SIP message is transmitted from the OEM application according to the RCS function; and transmit the second SIP message to a network in response to determining the second SIP message is transmitted from the OEM application.

* * * * *